(12) United States Patent  
Hartman et al.

(10) Patent No.: US 7,493,912 B2  
(45) Date of Patent: Feb. 24, 2009

(54) FIXED CONE SLEEVE VALVE HAVING CONE SUPPORTED BY MEANS DOWNSTREAM OF THE GATE IN ITS CLOSED POSITION

(76) Inventors: Brian T. Hartman, 2253 E. Contassa Cir., Mesa, AZ (US) 85213; Thomas A. Hartman, 700 Capac Ct., St. Louis, MO (US) 63125

( * ) Notice: Subject to any disclaimer, the term of this patent is extended or adjusted under 35 U.S.C. 154(b) by 301 days.

(21) Appl. No.: 11/450,010

(22) Filed: Jun. 9, 2006

(65) Prior Publication Data

US 2007/0284002 A1 Dec. 13, 2007

(51) Int. Cl.
*F16K 1/12* (2006.01)
(52) U.S. Cl. ..................................... 137/219
(58) Field of Classification Search ................ 137/219; 251/324, 326
See application file for complete search history.

(56) References Cited

U.S. PATENT DOCUMENTS

| 1,477,722 | A | * | 12/1923 | Slattery | ....................... 251/31 |
| 1,582,782 | A | * | 4/1926 | Price | .......................... 239/464 |
| 5,950,660 | A | | 9/1999 | Hartman | |
| 6,296,009 | B1 | | 10/2001 | Hartman | |

\* cited by examiner

*Primary Examiner*—Stephen M Hepperle
*Assistant Examiner*—Craig M Schneider
(74) *Attorney, Agent, or Firm*—Thompson Coburn LLP

(57) ABSTRACT

A sleeve valve comprising a conduit, a gate, and a shut-off member. The conduit and the shut-off member are fixed in position relative to each other. The gate is movable relative to the shut-off member between opened and closed positions. The gate engages the shut-off member when the gate is in the closed position in a manner preventing fluid from flowing through the fluid passageway of the gate. The opened position of the gate allows fluid to flow through the valve. The valve is devoid of any structure within the fluid passageway of the gate attaching the shut-off member to the conduit.

16 Claims, 5 Drawing Sheets

FIXED CONE SLEEVE VALVE HAVING CONE SUPPORTED BY MEANS DOWNSTREAM OF THE GATE IN ITS CLOSED POSITION

FIELD OF THE INVENTION

This invention This invention pertains generally to low head loss flow control valves. More particularly, the invention pertains to fixed cone sleeve valves.

Sleeve valves have been employed to control the flow rate and head pressure of fluids in industrial piping systems, hydro-power facilities, agricultural facilities, water and sewage distribution systems, and industrial piping systems. Sleeve valves are often utilized for their ability to operate without the moving components of the valve having to work against the head pressure of the fluid being supplied to the valve. An example of a fixed cone sleeve valve is described in U.S. Pat. No. 6,296,009, entitled Arm-Driven Sleeve Valve With Centralized Drive Mechanism, which issued Oct. 2, 2001 and is hereby incorporated in its entirety by reference. Conventional arm-driven sleeve valves often comprise a tubular inlet conduit, a tubular gate, and a cone shaped shut-off member. It is common for the shut-off member to be rigidly attached to the inlet conduit via a plurality of ribs that extend into the fluid passageway of the inlet conduit. The gate typically is linearly movable over the inlet conduit in a telescoping manner and in a manner such that it is able to engage against the shut-off member to prevent fluid from passing through the valve.

Although such fixed cone sleeve valves have proven to be highly useful, there are also problems related to such valves. One such problem is that the ribs that secure the shut-off member to the inlet conduit obstruct the fluid passageway within the inlet conduit, and thereby slightly restrict the flow through the valve. As can be appreciated, this lowers the overall efficiency of the valve. Additionally, one can appreciate that the ribs are necessarily relatively rigid do to the fact that they must transmit high loads that act on the shut-off member due to head pressure to wall of the inlet conduit. When the valve is closed and the fluid passageway of the inlet conduit experiences head pressures of several hundred pounds per square inch, the rigidity of the ribs resists the circumferential strain expansion of the inlet conduit. Thus the ribs cause the inlet conduit to deform non-uniformly under load and thereby create additional stresses that fatigue the connections between the ribs and the wall of the inlet conduit. Yet another disadvantage of such convention fixed cone sleeve valves is that debris such as vines and braches tend to become entangled with the ribs that secure the shut-off member to the inlet conduit. In addition to such debris causing further restriction of the fluid passageway through the valve, in some cases, the debris can prevent the valve from functioning properly. This is because such debris entangled on the ribs often extends between the gate and the shut-off member and thereby prevents the gate from returning to its closed position against the shut-off member. When this occurs, it can be time consuming and costly to isolate the valve from the fluid source in an effort to clear the debris from the valve.

SUMMARY OF THE INVENTION

The present invention overcomes many of the disadvantages associated with prior art fixed cone sleeve valves. In general, a sleeve valve in accordance with the present invention is devoid of ribs directly connecting the shut-off member to the inlet conduit and thereby is devoid of the problems associated therewith.

In a first aspect of the invention, a valve comprises a conduit, a gate, and a shut-off member. The conduit and the shut-off member are fixed in position relative to each other. The conduit has a fluid passageway extending therethrough. The gate has a fluid passageway extending therethrough and is movable relative to the shut-off member between opened and closed positions. At least a portion of the conduit is slidably received within the fluid passageway of the gate. The fluid passageway of the conduit is in fluid communication with the fluid passageway of the gate when the gate is in the opened position and when the gate is in the closed position. The gate is engaged with the shut-off member when the gate is in the closed position in a manner preventing fluid from flowing through the fluid passageway of the gate. The opened position of the gate allows fluid to flow through the fluid passageway of the gate. The valve is devoid of any structure within the fluid passageway of the gate attaching the shut-off member to the conduit.

In another aspect of the invention, a valve comprises a conduit, a gate, and a shut-off member. The conduit has a fluid passageway extending therethrough. The gate has a fluid passageway extending therethrough and is movable relative to the shut-off member between opened and closed positions. The conduit and the shut-off member are rigidly fixed in position relative to each other by structure external to the fluid passageway of the gate. At least a portion of the conduit is slidably received within the fluid passageway of the gate. The fluid passageway of the conduit is in fluid communication with the fluid passageway of the gate when the gate is in the opened position and when the gate is in the closed position. The gate is engaged with the shut-off member when the gate is in the closed position in a manner preventing fluid from flowing through the fluid passageway of the gate. The opened position of the gate allows fluid to flow through the fluid passageway of the gate.

While the principal advantages and features of the invention have been described above, a more complete and thorough understanding of the invention may be obtained by referring to the drawings and the detailed description of the preferred embodiment, which follow.

BRIEF DESCRIPTION OF THE DRAWING FIGURES

Figure 1:
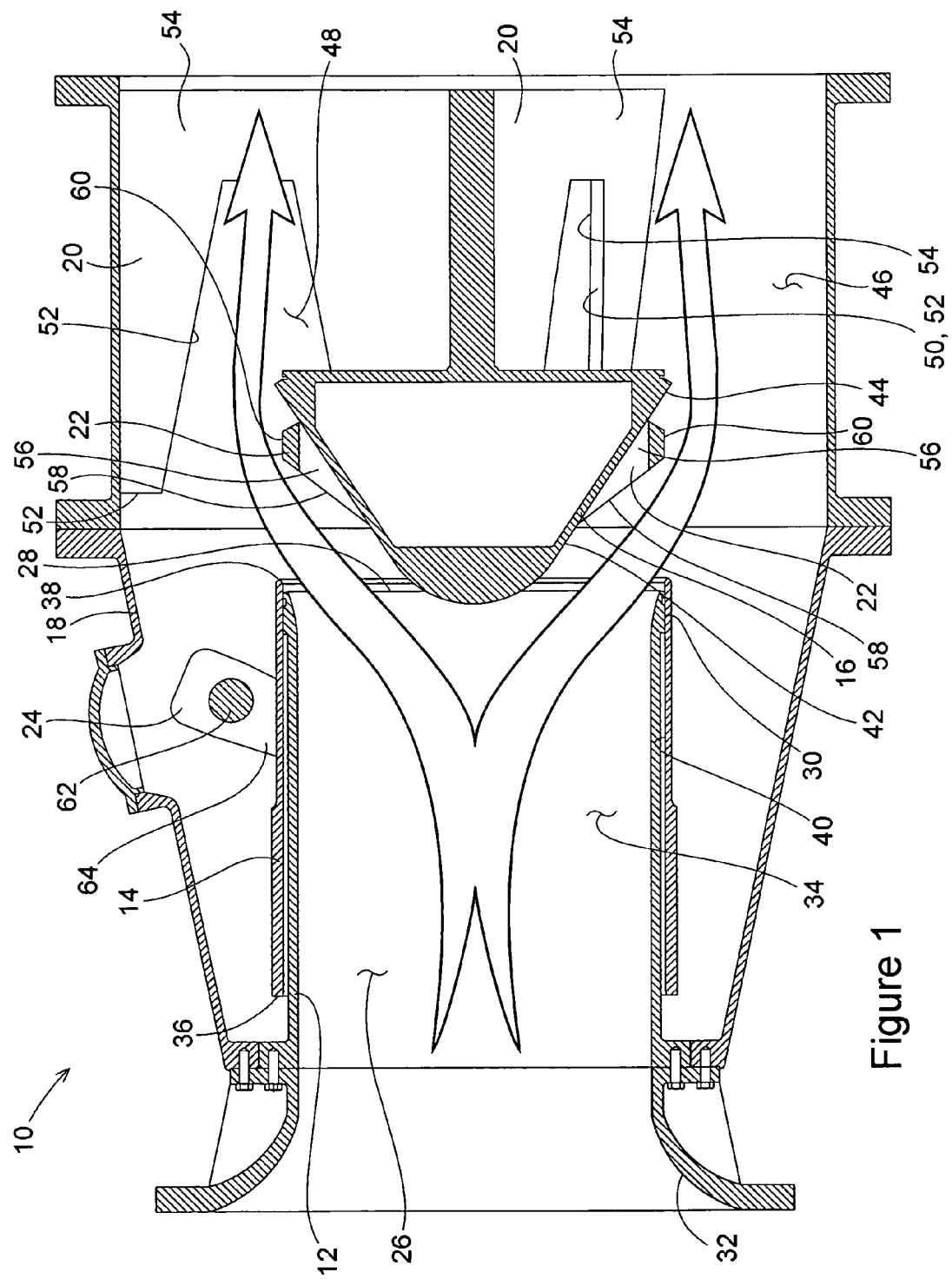
FIG. 1 is a cross-sectional elevation view of a preferred embodiment of a valve in accordance with the invention taken about the center axis of its gate, and is shown with the gate in the opened position.

Reference characters in the written specification indicate corresponding items shown throughout the drawing figures.

DETAILED DESCRIPTION OF THE PREFERRED EMBODIMENT OF THE INVENTION

A preferred embodiment of a valve in accordance with the invention is shown in FIGS. 1-5 and is referenced herein by the numeral 10. The valve 10 preferably comprises a conduit 12, a gate 14, a shut-off member 16, a housing 18, a plurality of ribs 20, a plurality of guide members 22, and an actuation mechanism 24.

The conduit 12 comprises a fluid passageway 26 that preferably serves as an inlet for fluid into the valve 10. Preferably the fluid passageway 26 of the conduit 12 is generally cylindrical as it approaches the downstream end 28 of the conduit. Similarly, the exterior surface 30 of the conduit 12 is preferably cylindrical as it approaches the downstream end 28 of the conduit. The upstream end of the conduit 12 may comprise a flared opening 32 (as shown) which can be in direct communication with a body of water, or may be attached to some other conduit (not shown) that delivers fluid to the valve 10.

The gate 14 preferably is in the form of a generally cylindrical tube that comprises a fluid passageway 34 that extends between opposite upstream 36 and downstream ends 38 of the gate. The gate 14 is preferably slidably connected to the downstream end 28 of the conduit 12 in a manner such that the interior surface 40 of the gate engages the exterior surface 30 of the conduit and such that the gate can linearly slide back and forth along its center axis relative to the conduit. The engagement between the interior surface 40 of the gate 14 and the exterior surface 30 of the conduit 12 preferably forms an annular watertight seal that prevents water from passing between such surfaces.

The shut-off member 16 preferably has a generally conical upstream surface 42 that includes an annular sealing portion 44. The conical shape of the upstream surface 42 provides the shut-off member 16 with a rigidity sufficient to withstand pressure heads of one thousand feet of water or more with minimal deflection, and facilitates the relatively smooth channeling of water through the valve 10.

The housing 18 preferably comprises an interior cavity 46 that includes a generally cylindrical portion that forms a downstream fluid passageway 48 which allows fluid to be discharged from the valve. The gate 14 and the shut-off member 16 are preferably positioned within the interior cavity 46 of the housing 18. Additionally, the housing 18 is preferably rigidly connected to the conduit 12 upstream of the gate 14.

Preferably, there are three ribs 20 formed from plate steel that are positioned within the interior cavity 46 of the housing 18. Preferably, the ribs 20 are joined to each other along the center axis defined by the gate 14 and extend generally radially outward therefrom. The ribs 20 are preferably evenly spaced circumferentially about the center axis of the gate 14 and are preferably welded to the housing 18 and to the shut-off member 16, thereby rigidly fixing the shut-off member in position relative to the conduit 12. A large notch 50 preferably extends through the upstream edge 52 of each rib 20. As shown in the drawing figures, each rib 20 is preferably slightly skewed in a manner such that its opposite planar surfaces 54 lie in parallel planes that are oriented at an acute angle relative to the center axis defined by the gate 14.

The guide members 22 are also each preferably formed out of plate steel and preferably are welded to and extend from the upstream surface 42 of the shut-off member 16. Preferably, the opposite planar surfaces 56 of each guide member 22 are oriented parallel to the center axis defined by the gate 14, but are also angled from being parallel to the radial direction of the center axis. The guide members 22 each have a leading or upstream edge 58 and a contact edge 60. The upstream edges 58 of the guide members 22 slope in a general downstream direction as they extend radially away from the center axis defined by the gate 14. The contact edges 60 of the guide members 22 are preferably radially positioned from the center axis by distance such that guide members are able to slidably engage with the interior surface 40 of the gate 14.

The actuation mechanism 24 comprises a shaft 62 and pair of swing arms 64. The swing arms 64 may be separate as shown or may be part of a wishbone configuration as disclosed in U.S. Pat. No. 6,296,009. The swing arms 64 are rotational fixed to the shaft 62 and shaft is pivotally connected to the housing 18. The swing arms are also pivotally and connected to the gate 14. The actuation mechanism 24 is preferably a conventional actuation mechanism of the type wherein shaft 62 is driven to pivot about its axis relative to the housing 18 in a manner causing the swing arms 64 to swing about the shaft's axis and to thereby move the gate 14 linearly back and forth.

Figure 2:
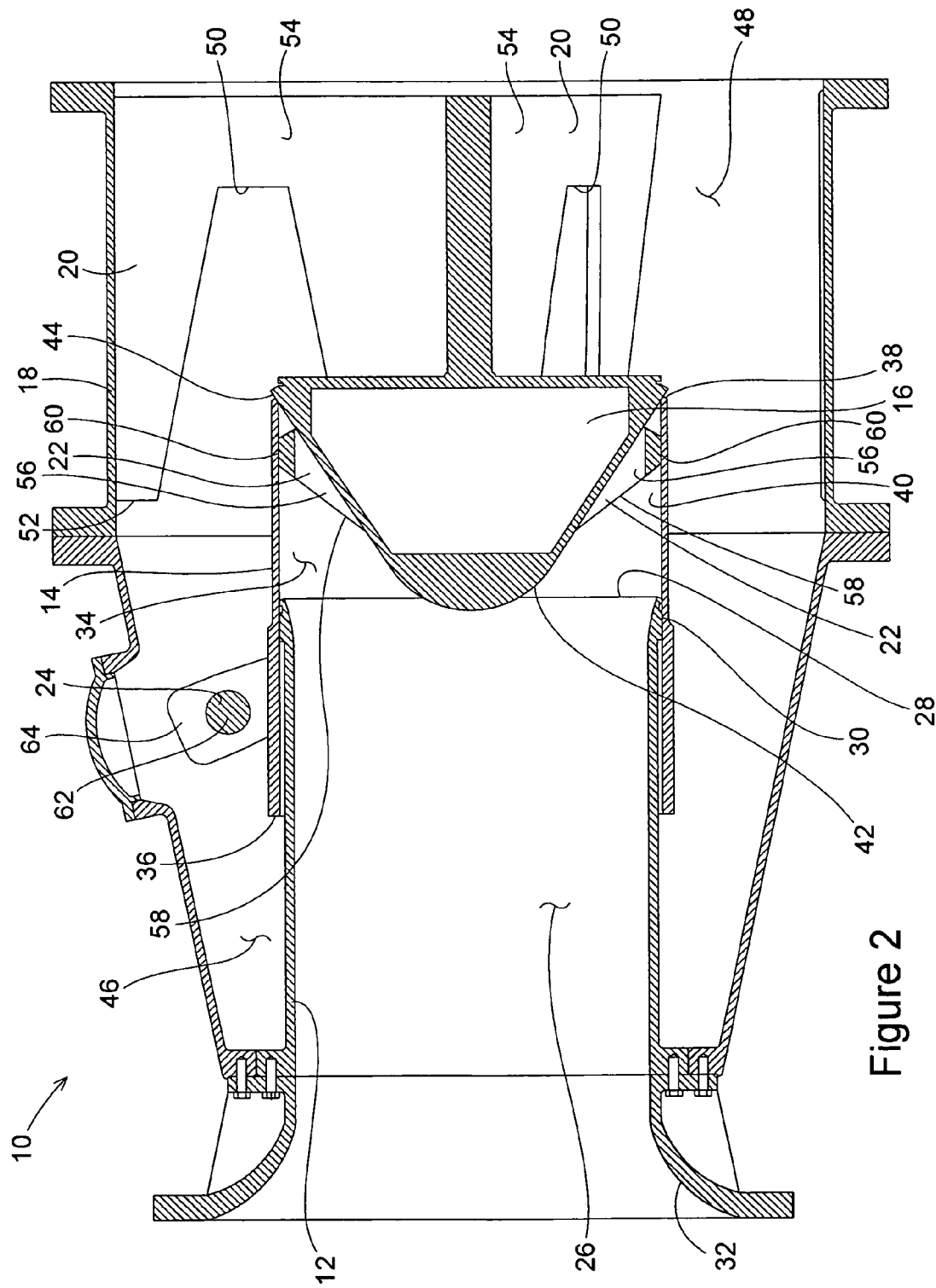
FIG. 2 is a similar cross-sectional elevation view of the valve shown in FIG. 1, but with the gate in the closed position.

In operation, the gate 14 of the valve 10 can be moved, via the actuation mechanism 24, linearly back forth relative to the conduit 12 and the shut-off member 16 between an opened position, as is shown in FIG. 1, and a closed position, as shown in FIG. 2. In the opened position, the gate 14 is disengaged from the shut-off member 16 and fluid within the fluid passageway 26 of the conduit 12 is free to pass into the downstream fluid passageway 48 of the housing 18. Assuming that there is a pressure differential across the valve 10, fluid will flow from the fluid passageway 26 of the conduit 12 into the downstream fluid passageway 48 of the housing 18 and ultimately out of the valve.

As the fluid passes through the valve, it also passes through the fluid passageway 34 of the gate 14 and through the gaps between the ribs 20. The orientation of the guide members 22 acts to induce rotational flow about the center axis on fluid passing between the guide members as such flow moves radially away from the center axis. Similarly, the orientation of the ribs 20 acts to induce rotational flow about the center axis on fluid passing between the ribs as such flow moves axially relative to the center axis. As is known to those skilled in the art, such rotational flow (which herein shall include irrotational flow moving in a vortex manner) increases the flow rate of fluid passing through the open valve for any given pressure differential.

It should be appreciated that the downstream fluid passageway 48 of the housing 18 has a cross sectional area that is significantly larger than does the fluid passageway 26 of the conduit 12. As such, the presence of the ribs 20 in the downstream fluid passageway 48 of the housing 18 does not act as a restrictor on the flow of fluid through the valve 10. In contrast, the presence of ribs joining the shut-off member 16 directly to the conduit 12 within the fluid passageways 26, 34 of the conduit 12 or the gate 14, as is common in prior art valves, does, in most cases, restrict fluid flow through the valve. It should also be appreciated that the absence of ribs joining the shut-off member 16 directly to the conduit 12 eliminates the possibility of debris becoming entangled on such ribs and thereafter obstructing the operation of the valve by preventing the closure of the gate 14.

When the gate 14 is in the closed position, the downstream end 38 of the gate engages with the annular sealing portion 44 of the shut-off member 16 and thereby prevents fluid communication between the fluid passageway 26 of the conduit 12 and the downstream fluid passageway 48 of the housing 18. Thus, with the gate 14 in the closed position, fluid is not able to pass through the valve 10. It should be appreciated that when the valve is closed, a large pressure differential of several hundred pound per square inch may exist between the fluid passageway 26 of the conduit 12 and the interior cavity 46 of the housing 18, and that the absence of ribs joining the shut-off member 16 directly to the conduit allows the conduit to expand circumferentially under such stress in an even manner. Thus, the lack of ribs joining the conduit to the shut-off member eliminates unwelcome stress risers that would otherwise fatigue the conduit and the connection between the conduit and the ribs.

Figure 3:
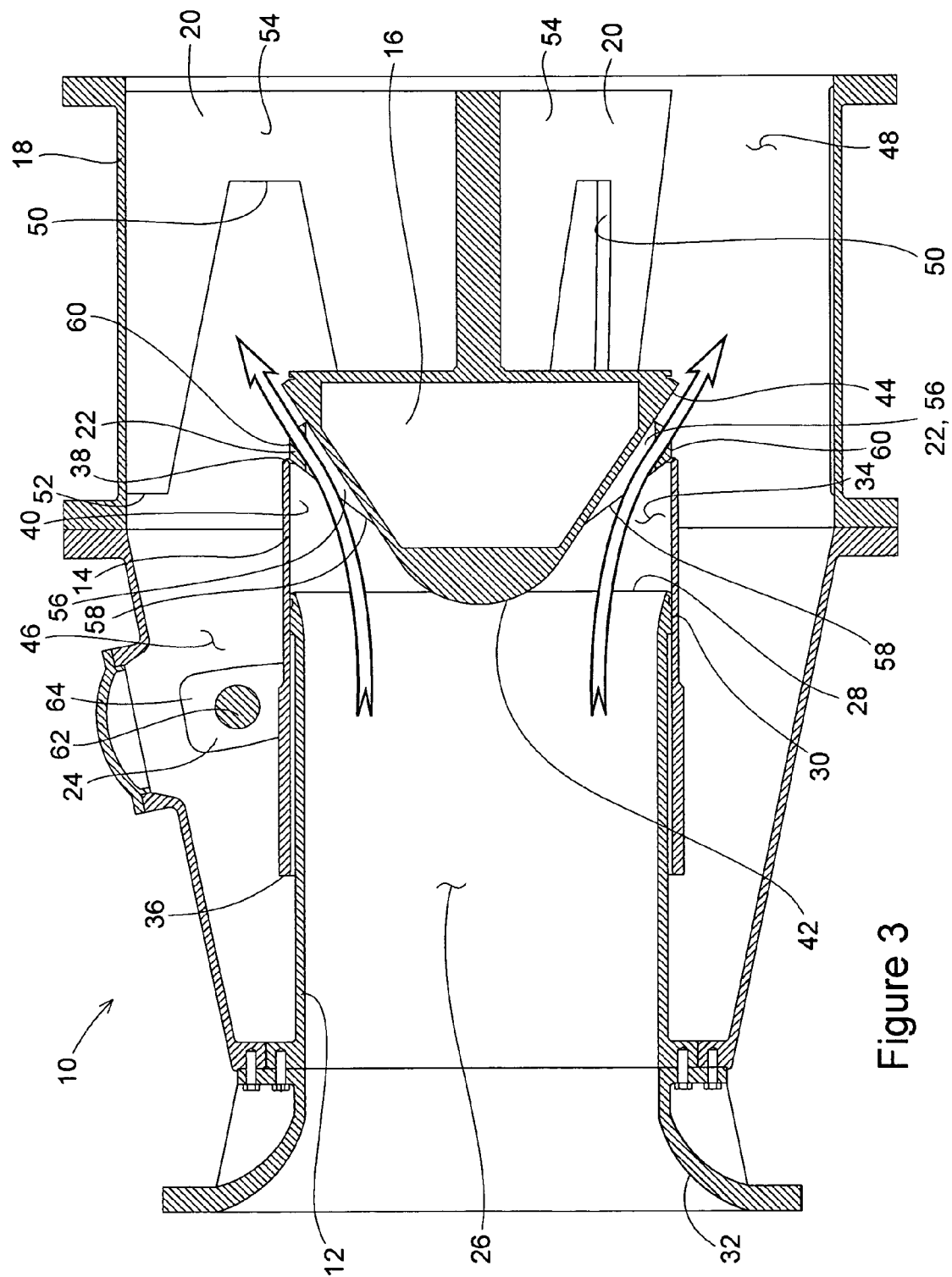
FIG. 3 is yet another similar cross-sectional elevation view of the valve shown in FIGS. 1 and 2, and is shown with the gate in an intermediate position.
Figure 4:
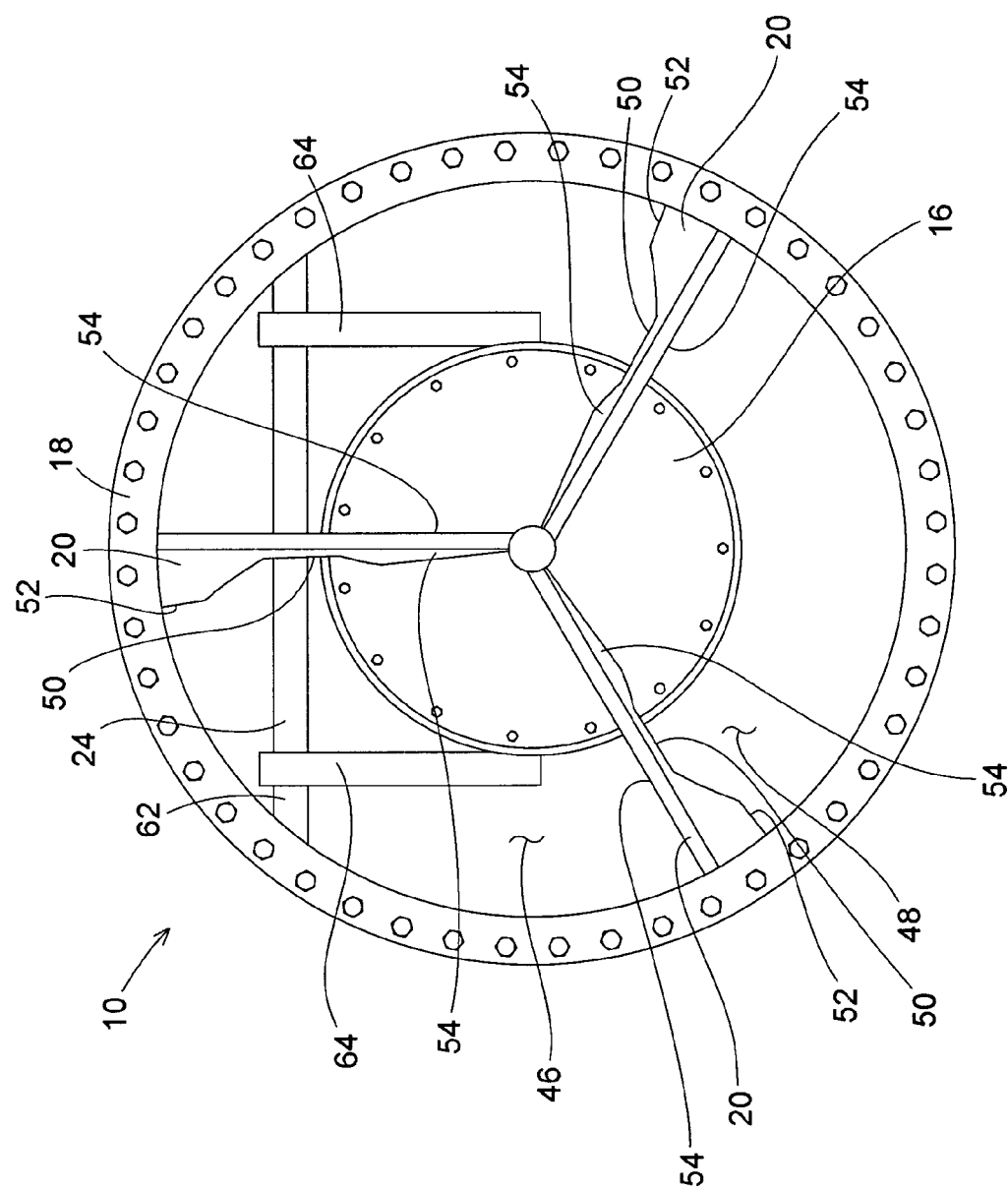
FIG. 4 is a right elevation view of the valve shown in FIGS. 1-3.
Figure 5:
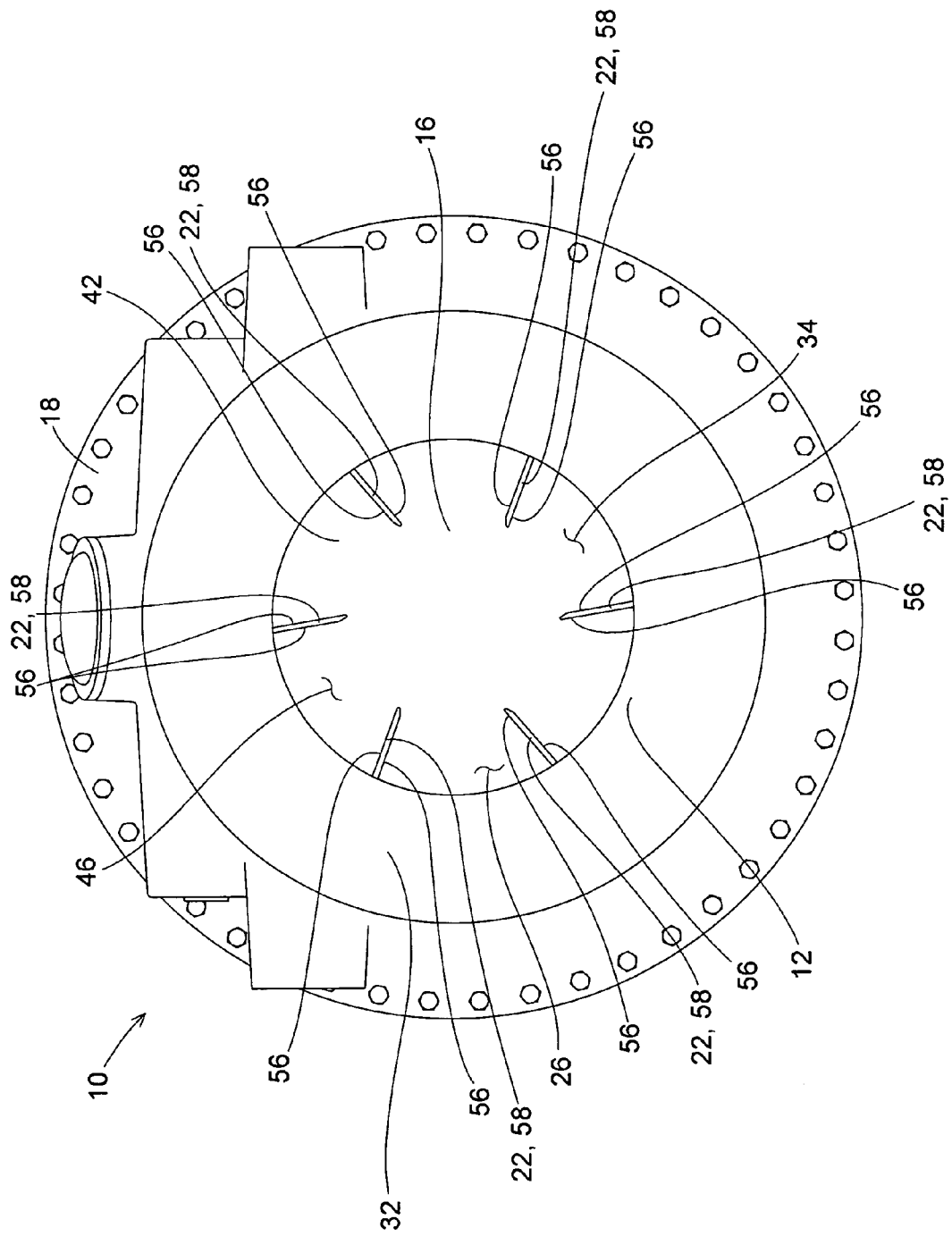
FIG. 5 is a left elevation view of the valve shown in FIGS. 1-4.

As the gate 14 initially moves away from the closed position, the guide members 22 maintain engagement with the interior surface 40 of the gate until the gate reaches an intermediate position, which is shown in FIG. 3. After the gate 14 reaches the intermediate position, further movement of the gate away from the closed position separates the gate from the guide members 22. By engaging the gate 14 when the valve 10 is only partially opened, the guide members 22 radially stabilize the gate and prevent harmful radial oscillation of the gate that could otherwise occur as a result of nonuniform flow passing through a relative narrow opening between the downstream end 38 of the gate and the shut-off member 16. It should also be appreciated that when the gate 14 is between the intermediate position and the opened position, the downstream end 38 of the gate is spaced from the shut-off member 16 by a distance that is large enough to avoid creating such oscillation. Still further, it should be appreciated that when the gate 14 is between the closed position and the intermediate position, there is the possibility that debris may become entangled on the guide members 22 since all of the flow passing through the valve 10 must then pass between the guide members. However, any such debris can be automatically dislodged from guide members 22 by moving the gate toward the opened position sufficiently beyond the intermediate position. The sloped nature of the upstream edges 58 of the guide members 22 facilitates this automatic dislodging of debris.

In addition to the above-described aspects of the invention, it should be appreciated the valve 10 of the preferred embodiment may comprise and access port which would allow workers to enter the valve when the gate 14 is in the closed position. As such any debris that has become entangled upon the ribs 20 of the valve 10 can be easily removed from the valve without taking the valve off-line from the fluid source. It should also be appreciated that the configuration of the ribs 20, notably the notches 50 therein, allow the valve 10 to accommodate a cylindrical or conical velocity shredder (not shown) downstream of the shut-off member 16.

While the present invention has been described in reference to a specific embodiment, in light of the foregoing, it should be understood that all matter contained in the above description or shown in the accompanying drawings is intended to be interpreted as illustrative and not in a limiting sense and that various modifications and variations of the invention may be constructed without departing from the scope of the invention defined by the following claims. Thus, other possible variations and modifications should be appreciated.

Furthermore, it should be understood that when introducing elements of the present invention in the claims or in the above description of the preferred embodiment of the invention, the terms "comprising," "including," and "having" are intended to be open-ended and mean that there may be additional elements other than the listed elements. Similarly, the term "portion" should be construed as meaning some or all of the item or element that it qualifies.

What is claimed is:

1. A valve comprising a conduit, a gate, and a shut-off member, the conduit and the shut-off member being fixed in position relative to each other, the conduit having a fluid passageway extending therethrough, the gate having a fluid passageway bound by an inner surface of the gate and extending therethrough and the gate being movable relative to the shut-off member between opened and closed positions, at least a portion of the conduit being slidably received within the fluid passageway of the gate, the fluid passageway of the conduit being in fluid communication with the fluid passageway of the gate when the gate is in the opened position and when the gate is in the closed position, the gate being engaged with the shut-off member when the gate is in the closed position in a manner preventing fluid from flowing through the fluid passageway of the gate, the opened position of the gate allowing fluid to flow through the fluid passageway of the gate, the valve being devoid of any structure within the fluid passageway of the gate attaching the shut-off member to the conduit, the fluid passageway of the gate having a center axis along which that gate moves linearly between the opened and closed positions, the gate having an intermediate position that is between the opened and closed positions, the valve further comprising guide members that extend from the shut off member toward the conduit, each of the guide members being configured and adapted to limit radial movement of the gate relative to the center axis by engaging the inner surface of the gate from within the fluid passageway of the pate when the pate is between the closed position and the intermediate position, the guide members being spaced from each other in a manner allowing fluid to flow through the fluid passageway of the gate when the gate is in any position other than the closed position.

2. A valve in accordance with claim 1 wherein the valve further comprises a housing, the housing has a cavity, the gate and the shut off member are positioned within the cavity of the housing, and the housing is rigidly connected to the conduit and to the shut-off member.

3. A valve in accordance with claim 2 wherein at least a portion of the cavity of the housing external to the conduit, the gate, and the shut-off member constitutes a fluid passageway of the housing, the fluid passageway of the housing is in fluid communication with the fluid passageway of the gate when the gate is in the opened position, fluid communication between the fluid passageway of the housing and the fluid passageway of the gate is prevented when the gate is in the closed position, the valve is configured and adapted to allow fluid to pass therethrough via the fluid passageway of the conduit, the fluid passageway of the gate, and the fluid passageway of the housing when the gate is in the opened position, and the valve is configured and adapted to prevent fluid from passing therethrough when the gate is in the closed position.

4. A valve in accordance with claim 3 wherein the valve further comprises a plurality of ribs within the interior cavity of the housing, each rib extends radially from the shut off member to the housing relative to the center axis, the ribs rigidly connect the shut off member to the housing, and the fluid passageway of the housing extends between at least two of the ribs.

5. A valve in accordance with claim 4 wherein the ribs are oriented in manner to induce rotational flow about the center axis on fluid passing between the ribs when the gate is in the opened position and fluid is passing through the valve.

6. A valve in accordance with claim 1 wherein the guide members are oriented in manner to induce rotational flow about the center axis on fluid passing between the guide members when the gate is in the intermediate position and fluid is passing through the valve.

7. A valve in accordance with claim 4 wherein the guide members and the ribs are oriented in manner to induce rotational flow about the center axis on fluid passing through the fluid passageway of the housing.

8. A valve in accordance with claim 1 when the shut off member has a conical surface and extends into the fluid passageway of the gate when the gate is in the closed position.

9. A valve comprising a conduit, a gate, and a shut-off member, the conduit having a fluid passageway extending therethrough, the gate having a fluid passageway bound by an inner surface of the gate and extending therethrough and the gate being movable relative to the shut-off member between opened and closed positions, the conduit and the shut off member being rigidly fixed in position relative to each other by structure external to the fluid passageway of the gate, at least a portion of the conduit being slidably received within the fluid passageway of the gate, the fluid passageway of the conduit being in fluid communication with the fluid passageway of the gate when the gate is in the opened position and when the gate is in the closed position, the gate being engaged with the shut-off member when the gate is in the closed position in a manner preventing fluid from flowing through the fluid passageway of the gate, the opened position of the gate allowing fluid to flow through the fluid passageway of the gate, the fluid passageway of the gate having a center axis along which that gate moves linearly between the opened and closed positions, the gate having an intermediate position that is between the opened and closed positions, the valve further comprising guide members that extend from the shut off member toward the conduit, each of the guide members being configured and adapted to limit radial movement of the gate relative to the center axis by engaging the inner surface of the gate from within the fluid passageway of the gate when the gate is between the closed position and the intermediate position, the guide members being spaced from each other in a manner allowing fluid to flow through the fluid passageway of the gate when the gate is in any position other than the closed position.

10. A valve in accordance with claim 9 wherein the valve further comprises a housing, the housing has a cavity, the gate and the shut off member are positioned within the cavity of the housing, and the housing is rigidly connected to the conduit and to the shut-off member.

11. A valve in accordance with claim 10 wherein at least a portion of the cavity of the housing external to the conduit, the gate, and the shut-off member constitutes a fluid passageway of the housing, the fluid passageway of the housing is in fluid communication with the fluid passageway of the gate when the gate is in the opened position, fluid communication between the fluid passageway of the housing and the fluid passageway of the gate is prevented when the gate is in the closed position, the valve is configured and adapted to allow fluid to pass therethrough via the fluid passageway of the conduit, the fluid passageway of the gate, and the fluid passageway of the housing when the gate is in the opened position, and the valve is configured and adapted to prevent fluid from passing therethrough when the gate is in the closed position.

12. A valve in accordance with claim 11 wherein the valve further comprises a plurality of ribs within the interior cavity of the housing, each rib extends radially from the shut off member to the housing relative to the center axis, the ribs rigidly connect the shut-off member to the housing, and the fluid passageway of the housing extends between at least two of the ribs.

13. A valve in accordance with claim 12 wherein the ribs are oriented in manner to induce rotational flow about the center axis on fluid passing between the ribs when the gate is in the opened position and fluid is passing through the valve.

14. A valve in accordance with claim 9 wherein the guide members are oriented in manner to induce rotational flow about the center axis on fluid passing between the guide members when the gate is in the intermediate position and fluid is passing through the valve.

15. A valve in accordance with claim 12 wherein the guide members and the ribs are oriented in manner to induce rotational flow about the center axis on fluid passing through the fluid passageway of the housing.

16. A valve in accordance with claim 9 when the shut off member has a conical surface and extends into the fluid passageway of the gate when the gate is in the closed position.

* * * * *